2,908,677

NICKEL AND COBALT COMPLEXES OF PYRAZOLONE MONOAZO COMPOUNDS

James M. Straley, John G. Fisher, and David J. Wallace, Kingsport, Tenn., assignors to Eastman Kodak Company, Rochester, N.Y., a corporation of New Jersey No Drawing. Application March 30, 1955
Serial No. 498,112

5 Claims. (Cl. 260—147)

This invention relates to new azo compounds and their application to the art of dyeing or coloring. More particularly, it relates to certain metallized aryl monoazo pyrazolone compounds and their application to the dyeing or coloration of various materials. Insofar as dyeing or coloring is concerned, the invention is particularly directed to the dyeing or coloring of cellulose acetate textile materials.

The metallized monoazo compounds of our invention contain chromium, cobalt, copper, iron, manganese, nickel or vanadium in complex combination with a monoazo compound which is free of water-solubilizing groups and which has the formula:

(I) $\quad Q-N=N-Q_1$ wherein Q represents a monocyclic benzene nucleus containing an alkoxy group having 1 to 2 carbon atoms in the ortho position or the para position to the azo bond and $Q_1$ represents the radical of a 5-pyrazolone compound joined to the azo bond through the carbon atom in its 4-position.

While our invention relates broadly to the metallized monoazo compounds just described, the azo compounds of our invention are represented for the most part by the chromium, cobalt, copper, iron, manganese, nickel or vanadium form of the azo compounds having the formula:

(II)

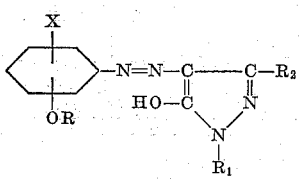

wherein R represents a methyl group, an ethyl group or a β-hydroxyethyl group, X represents a hydrogen atom, a methoxy group, an ethoxy group or a β-hydroxyethoxy group, $R_1$ represents a hydrogen atom, a phenyl radical, a methylphenyl radical, a chlorophenyl radical, a methoxyphenyl radical, an ethoxyphenyl radical, a nitrophenyl radical or a cyanophenyl radical, $R_2$ represents a methyl group, a carboxyl group, a carbomethoxy group, a carboethoxy group, an amino group, a hydroxy group or a trifluoromethyl group and wherein the OR group is in a position selected from the ortho position and the para position to the azo bond.

The metallized monoazo compounds of our invention are prepared by treating the non-metallized monoazo compounds which are free of water-solubilizing groups and which have the formula designated I with salts of nickel, cobalt, copper, chromium, manganese, iron or vanadium. The non-metallized monoazo compounds can be metallized either on or off the fiber. Metallization can be carried out, for example, by treating the non-metallized dye with a solution or dispersion of the metallizing agent. Although the metal complex is often formed at room temperature, we prefer to accelerate the process by heating, usually with steam, for a short time. The preparation of the metallized monoazo compounds of our invention is fully described hereinafter.

The non-metallized monoazo compounds which are free of water-solubilizing groups and which have the formula I are prepared by diazotizing a monocyclic primary aminobenzene compound containing an alkoxy group having 1 to 2 carbon atoms in ortho-or para-position to the primary amino group and coupling the diazonium compound obtained with a 5-pyrazolone compound. These compounds, in addition to being dyes for various materials identified herein, possess the important property of being metallizable and form the starting materials from which the metallized monoazo compounds of our invention are prepared.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be otbained by dyeing the cellulose acetate textile material with the non-metallized azo compounds described herein and then treating the dyed cellulose acetate textile material with suitable metal salts which cause the original dye to form metallic complexes which are resistant, for example, to the action of washing, light and gas. Thus, by means of the present invention, the disadvantage noted above with respect to the wash fastness of dyed cellulose acetate textile materials is either entirely or largely overcome.

While reference has been made to the dyeing of cellulose acetate textile materials, it is to be understood that the invention is generally applicable to the dyeing of textile materials made of or containing a cellulose alkyl carboxylic acid ester having two to four carbon atoms in the acid groups thereof. By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate. Cellulose acetate has been particularly referred to because it is the most widely used cellulose alkyl carboxylic acid ester.

Illustrative of the metallizing agents that can be employed are the halides, the sulfates, the acetates, the cyanides, and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [$Ni(SCN)_2$], cobaltous bromide, cabaltic chloride, cobaltous chloride, cobaltous acetate, cobaltous cyanide, cobalt thiocyanate [$Co(SCN)_2$], cupric chloride, cupric bromide, cupric acetate, cupric lactate, chromium trichloride, chromium tribromide, chromic sulfate, chromic acetate, chromium thiocyanate [$Cr(SCN)_3$], manganese chloride, manganous sulfate, manganese acetate, manganese thiocyanate [$Mn(SCN)_2$], ferric chloride, ferric fluoride, ferrous acetate, ferrous thiocyanate [$Fe(SCN)_2$], ferric thiocyanate [$Fe(SCN)_3$] and vanadium thiocyanate [$V(SCN)_2$], are illustrative of the metallizing agents that can be employed.

When the metal complex is formed on a cellulose alkyl carboxylic acid ester, such as cellulose acetate, fiber the use of a metal thiocyanate appears to be advantageous and is preferred. Nickel thiocyanate appears to be especially useful and particular claim is laid to its use. Next to nickel thiocyanate the use of cobalt thiocyanate is preferred.

Ortho-anisidine, para-anisidine, 2,4-dimethoxyaniline, 2,4-diethoxyaniline, 2,5-dimethoxyaniline, 2,5-diethoxyaniline, 3,4-dimethoxyaniline, 3,4-diethoxyaniline, 2,5-di-β-hydroxyethoxyaniline, 2,5-dimethoxy-4-nitroaniline, 2,5-diethoxy-4-nitroaniline, 2,5-dimethoxy - 4 - chloroaniline, 2,5-diethoxy-4-chloroaniline and 2,5-dimethoxy-4-tertiary-butylaniline are representative of the monocyclic primary aminobenzene compounds containing an alkoxy group having 1 to 2 carbon atoms in ortho- or para-position to the primary amino group used in the preparation of the azo compounds of our invention.

3-methyl-5-pyrazolone, 3-carboxy-5-pyrazolone, 3-carbomethoxy-5-pyrazolone, 3-carboethoxy-5-pyrazolone, 3-amino-5-pyrazolone, 3-hydroxy-5-pyrazolone, 3-trifluoromethyl-5-pyrazolone, 1-phenyl-3-methyl-5-pyrazolone, 1-phenyl-3-amino-5-pyrazolone, 1-phenyl-3-hydroxy-5-pyrazolone, 1-(2-benzothiazolyl)-3-amino-5-pyrazolone, 1-phenyl-3-methyl-5-p-nitrophenyl pyrazolone, 3-phenyl-5-pyrazolone, 1-phenyl-3-carbomethoxy-5-pyrazolone, 1-phenyl-3-carboethoxy-5-pyrazolone, 1,3-dimethyl-5-pyrazolone, 1-p-nitrophenyl-3-methyl-5-pyrazolone, 1-o-nitrophenyl-3-methyl-5-pyrazolone, 1-p-methylphenyl-3-methyl-5-pyrazolone, 1-p-methoxyphenyl - 3 - amino-5-pyrazolone, 1-p-methylphenyl-3-amino-5-pyrazolone, 1-o-chlorophenyl-3-amino-5-pyrazolone, 1-p-chlorophenyl-3-amino-5-pyrazolone, 1-p-ethylphenyl-3-methyl-5-pyrazolone, 1-p-chlorophenyl-3-methyl-5-pyrazolone, 1-(2-benzothiazolyl)-3-methyl-5-pyrazolone and 1-(2-benzothiazolyl)-3-carbomethoxy-5-pyrazolone, for example, are illustrative of the pyrazolone compounds used in the preparation of the azo compounds of our invention.

The non-metallized monoazo dye compounds have varying utility for the dyeing of cellulose alkyl carboxylic acid esters having two to four carbon atoms in the acid groups thereof, nylon, acrylonitrile polymers, such as polyacrylonitrile and acrylonitrile graft polymers, and polyesters, such as polyethylene terephthalate. After application to these materials, usually in the form of textile materials, the dye may be metallized thereon, if desired. The metallized azo compounds of our invention can be applied by ordinary dyeing or printing techniques to nitrogenous textile materials such as wool, silk, nylon and acrylonitrile polymers, for example. In the case of the synthetic materials such as cellulose alkyl carboxylic acid esters having 2 to 4 carbon atoms, nylon, acrylonitrile polymers, and polyesters such as polyethylene terephthalate coloration can also be effected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents, such as, for example, cellulose acetate, cellulose acetate-propionate, acrylonitrile polymers, polyamides, methyl Cellosolve and formamide.

Both the non-metalized and metallized monoazo compounds are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer (a polymer prepared by the simultaneous polymerization in a single reaction mixture of two monomers) or a terpolymer (a polymer prepared by the simultaneous polymerization in a single reaction mixture of three monomers), or the like, and the graft polymers for which the dyes are particularly useful are those containing at least 5% by weight of combined acrylonitrile grafted to the preformed polymer molecule.

The graft polymers which can be dyed using the non-metallized and metallized dyes are thus polymers having directed placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a CH$_2$=C< group, or an interpolymer of two or more of such monomers; and the grafting can be effected with the preformed homopolymer or interpolymer in the polymerization mixture in which it was formed (i.e. a live polymer) or with the preformed polymer isolated from the polymerization mixture in which it was formed (i.e. a dead polymer).

The preformed polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citraconamate, a maleamate, or vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl ethers, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolymer whereby the acrylonitrile alone or together with another grafting monomer is combined with the preformed polymer molecule to give a graft polymer containing from 5 to 95% by weight of combined acrylonitrile.

The new azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U.S. Patent 2,620,324 issued December 2, 1952, U.S. Patent 2,649,434 issued August 18, 1953, and U.S. Patent 2,657,191 issued October 27, 1953, disclose other typical graft polymers that can be dyed with the new azo compounds of our invention.

The following examples illustrate the metallized monoazo compounds of our invention and their method of preparation.

*Example 1*

77 grams of 2,5-dimethoxyaniline were dissolved in 230 cc. of water containing 55 cc. of concentrated HCl. The resulting solution was heated to boiling after adding 4 grams of decolorizing charcoal and filtered while hot. The filtrate was cooled to 0° C. and 225 cc. of HCl were added thereto after which the 2,5-dimethoxyaniline was diazotized below 5° C. by adding a solution of 38 grams of sodium nitrite in 70 cc. of water. The excess nitrous acid present was destroyed by the addition of urea or sulfamic acid. The diazonium solution thus obtained was added slowly with good stirring to a solution of 87 grams of 1-phenyl-3-methyl-5-pyrazolone in 500 cc. of mixed propionic-acetic (1:5) acids at about 50° C. After the addition of the diazonium solution, the mineral acid present in the reaction mixture was made neutral to Congo red paper with ammonium acetate (sodium acetate can also be used) and the reaction mixture resulting was stirred for 1 hour at room temperature. The reaction mixture was drowned in 5000 cc. of water and the reaction product which precipitated was recovered by filtration, washed with water until neutral and dried at 60° C. under vacuum. 140 to 158 grams of the dye compound having the formula:

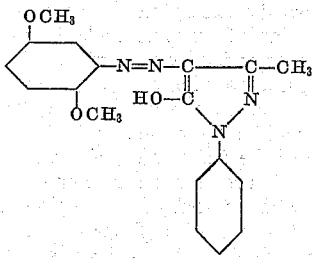

were obtained. This dye compound dyes cellulose acetate, nylon and protein fibers bright yellow shades. It is further distinguished by the fact that cotton and viscose fibers are not dyed in the slightest degree under any conditions of pH, hardness of water, or the addition of the usual electrolytes to the dyebath. This is of prime importance in obtaining cross-dyeing effects on fabrics of mixed construction.

*Example 2*

A mixture consisting of 47.5 grams of the product of Example 1, 38.5 grams of nickel acetate tetrahydrate, 17.5 grams of sodium carbonate and 2 liters of the monomethyl ether of ethylene glycol was stirred and refluxed for 8 hours. The resulting brown solution was drowned in 32 liters of water and brought to the boil with direct steam. The pigment was recovered by filtering the reaction mixture while hot, washing the pigment with hot water until neutral and then drying at 110° C. 56 grams of the nickel complex of the azo compound of claim 1 were thus obtained as a bright yellow product which, when incorporated into an acetone solution of cellulose acetate and extruded in the usual fashion, yields yellow yarn of exceptional resistance to the action of light and laundering agents.

*Example 3*

A solution of 4.52 grams of 2,5-diethoxyaniline in 3 cc. of concentrated HCl and 11 cc. of water was obtained by heating. One gram of decolorizing charcoal was added and the reaction mixture was heated to boiling and then filtered. 11 cc. of hydrochloric acid were added to the filtrate and the reaction mixture thus obtained was cooled to 0° C. The 2,5-diethoxyaniline was diazotized below 5° C. by the rapid addition of a solution of 1.8 grams of sodium nitrite in 5 cc. of water. After 30 minutes, the excess nitrous acid present in the reaction mixture was destroyed by the addition of urea (sulfamic acid can also be used). The diazonium solution thus obtained was added with good stirring to a solution of 3.7 grams of 3-trifluoromethyl-5-pyrazolone in 200 cc. of water and 4 grams of sodium hydroxide at 5° C.–10° C. After the coupling reaction which takes place was completed, the reaction mixture was poured into 1000 cc. of water and made acid by the addition of acetic acid and filtered. 6 to 7.5 grams of a dye compound which dyes cellulose acetate, nylon, wool, silk and the acrylonitrile graft polymer specifically described hereinafter deep orange shades were obtained.

*Example 4*

A solution of 4.95 grams of 4-nitro-2,5-dimethoxyaniline was prepared by forming with 5 grams of concentrated $H_2SO_4$ and 6.3 grams of water. The resulting solution was poured onto 25 grams of ice and the 4-nitro-2,5-dimethoxyaniline was diazotized by adding all at once with good stirring a solution of 1.8 grams of sodium nitrite in 5 cc. of water. In about 10 minutes a clear solution was obtained. Excess nitrous acid present was destroyed by adding sulfamic acid after which the diazonium solution was filtered and added below 10° C. with good stirring to a solution of 4 grams of 3-phenyl-5-pyrazolone in 200 cc. of water and 2.3 grams of sodium hydroxide. After 15 minutes, the reaction mixture thus obtained was drowned in 1000 cc. of water and then made acid with acetic acid. The dye compound which precipitated was recovered by filtration in a yield of 8.5 grams. It dyes cellulose acetate, nylon and the acrylonitrile graft polymer specifically described hereinafter yellow shades.

*Example 5*

A cellulose acetate fabric dyed with a 3% dyeing of the dye product of Example 1 was padded with a 3% aqueous solution of nickel thiocyanate under conditions such that a 60 to 100% pickup, based on the weight of the goods, was obtained. The cellulose acetate fabric was then aged in a steam chest under 5 p.s.i. pressure for 10 minutes after which it was scoured at 60° C. with soap and water for 10 minutes, rinsed well with water and dried. The bright yellow cellulose acetate fabric thus obtained shows no break after 60 hours' exposure on a Fade-O-meter whereas the unmetallized dyeing was badly faded after over 20 hours' exposure on the Fade-Ometer. Further, the metallized dyeing withstands a standard A.A.T.C.C. wash test at 160° F.

A cellulose acetate fabric dyed with a 0.5% dyeing of the dye product of Example 1 when given the same treatment described above yields a yellow dyeing which shows only a barely perceptible break after 60 hours' exposure to a Fade-Ometer.

*Example 6*

By the use of a 3% solution of cobalt thiocyanate in Example 5 in place of the 3% aqueous solution of nickel thiocyanate slightly duller yellow dyeings having the same excellent fastness properties as the dyeings of Example 5 are obtained.

*Example 7*

A solution of 36.9 grams of o-anisidine in 300 grams of water and 90 cc. of concentrated aqueous hydrochloric acid was cooled to 0° C. and a solution of 21 grams of sodium nitrite in 75 cc. of water was added with good stirring while maintaining the temperature of the reaction mixture between 0° C. and 2° C. The reaction mixture was stirred an additional 45 minutes at 0° C.–2° C. and at the end of this period the excess nitrous acid present was destroyed by the addition of sulfamic acid. The diazonium solution of o-anisidine thus prepared was added, with good stirring, over a period of about 30 minutes to a solution of 52.2 grams of 1-phenyl-3-methyl-5-pyrazolone in a mixture of 800 cc. of water, 48 grams of sodium hydroxide and 500 grams of ice. Following the addition of the diazonium solution, the reaction mixture was stirred for 3 hours without additional cooling after which it was made neutral by the addition of acetic acid. The dye compound which precipitated was recovered by filtration, washed with 2000 cc. of water in small portions and dried at 100° C. 92 grams of dye were obtained in the form of a yellow powder melting at 165° C.–167° C. This dye compound colors cellulose acetate, nylon and the acrylonitrile graft polymer described hereinafter yellow shades.

*Example 8*

43 grams of the dye product of Example 7, 42.5 grams of nickel acetate tetrahydrate [$Ni(OOCCH_3)_2 \cdot 4H_2O$], 17.5 grams of sodium carbonate and 1 liter of ethylene glycol monomethyl ether were refluxed together with stirring for 14 hours. The reaction mixture thus obtained was poured into 8 liters of water containing 20 to 100 grams of sodium chloride and the reaction mixture thus obtained was brought to a temperature of 90° C. with direct steam. The metallized dye product which precipitated was recovered by filtration, washed with 2000 cc. of water in small portions and dried at 110° C. 50 grams of the nickel complex of the dye compound of Example 7 were obtained in the form of a yellow powder. When this pigment material was intimately dispersed in finely divided condition in a cellulose acetate-acetone dope solution in a concentration of 2% (based on the weight of the cellulose acetate) and the cellulose acetate dope solution was extruded in the usual manner, a beautiful yellow yarn was obtained. Exposure of this product in the Atlas Fade-Ometer shows only a slight break in light fastness after 40 hours' exposure.

Example 9

A cellulose acetate fabric dyed with a 0.5% dyeing of the dye product of Example 7 was padded with a 3% aqueous solution of nickel thiocyanate in accordance with the procedure described in Example 5. The metallized dyeing (the nickel complex of the dye of Example 7) shows only a very slight break in light fastness after 60 hours' exposure on a Fade-Ometer whereas the unmetallized dyeing showed a break in light fastness after only 5 hours' exposure on the Fade-Ometer. In addition after an A.A.T.C.C. wash test at 160° C. using soap and soda ash, there is no loss in strength of the metallized dyeing nor any bleed-off onto an undyed multi material fabric made of silk, wool, nylon, cotton, viscose and cellulose acetate which was included in the wash test. The multi material fabric just referred to was made up of individual sections of fabric made of the materials just named.

Example 10

A solution of 15.4 grams of 2,5-dimethoxyaniline in a mixture of 46 cc. of water and 11 cc. of concentrated hydrochloric acid was brought to the boil. About 2 grams of decolorizing charcoal were added and, after standing 30 minutes on the steam bath, the mixture was filtered. 45 cc. of concentrated hydrochloric acid were added to the filtrate and the resulting solution was cooled to 0° C. A solution of 7.6 grams of sodium nitrite in 12 cc. of water was then added below the surface at 0–2° C. After stirring 10 minutes at this temperature the excess nitrous acid present was destroyed by the addition of sulfamic acid. The diazo solution thus obtained was stirred into a solution of 15.2 grams of 3-trifluoromethyl-5-pyrazolone in 500 cc. of water containing 28 grams of sodium hydroxide while maintaining the temperature below 10° C. After addition of the diazo solution, the reaction mixture was stirred for 2 hours without further cooling, diluted with twice its volume of cold water and made slightly acid by the addition of acetic acid. The reaction product which precipitated was recovered by filtration, washed well with water and dried at 60° C. The yield was 22.4 grams of a yellow dye compound which when applied to cellulose acetate according to the process of Example 5, gave yellow dyeings of excellent resistance to the action of light and laundering.

Example 11

15.4 grams of 2,5-dimethoxyaniline were diazotized exactly as in Example 10 and the diazo solution obtained was run into a solution of 17.5 grams of 3-amino-1-phenyl-5-pyrazolone in 500 cc. of water containing 28 grams of sodium hydroxide. Proceeding as in Example 10 there were obtained 27 grams of a yellow dye, which when applied to cellulose acetate in accordance with the procedure described in Example 5, gave beautiful yellow dyeings of outstanding resistance to light and washing.

Example 12

A solution of 12.3 grams of p-anisidine in 100 cc. of water and 30 cc. of concentrated hydrochloric acid was cooled to 0° C. and a solution of 7 grams of sodium nitrite in 25 cc. of water was added thereto with good stirring at 0–2° C. After one hour's further stirring at this temperature the excess nitrous acid present was destroyed by addition of sulfamic acid. The diazo solution thus prepared was added, with stirring, during the course of 30 minutes, to a solution of 15.2 grams of 3-trifluoromethyl-5-pyrazolone in a mixture of 250 cc. of water, 16 grams of sodium hydroxide and 200 grams of ice. After addition of the diazo solution, the reaction mixture was stirred two hours with no further cooling and then neutralized with acetic acid. The reaction product which precipitated was recovered by filtration, washed well with water and dried at 60° C. 24.5 grams of a dye were obtained. When this dye was applied to cellulose acetate according to the dyeing process of Example 5, brilliant yellow dyeings of superior fastness to light and laundering were obtained.

Example 13

The dye of Example 11 was prepared as before, except that after filtering and washing the moist filter cake was suspended in 500 cc. of water and the temperature brought to 60° C. 100 cc. of a 20% solution of nickel thiocyanate were run in between 60–70° C. with good stirring in about 30 minutes. The reaction mixture was brought in about one hour to 90° C. and held there, adding ammonium hydroxide meanwhile to keep it slightly alkaline. When no more acid was generated, the hot reaction mixture was filtered to obtain 28 grams of the nickel complex of the dye of Example 11. When the metallized pigment thus obtained is intimately dispersed in finely divided condition in a cellulose acetate-acetone dope solution and the cellulose acetate dope solution is extruded in known manner into fibers or films yellow fibers or films having excellent resistance to the action of light and washing are obtained.

Example 14

The dye of Example 12, similarly treated as in Example 13, also yielded a bright yellow pigment which also exhibited excellent fastness when molded or shaped in plastic compositions.

Example 15

40 grams of the dye compound of Example 10 were treated exactly in accordance with the process described in Example 8 to obtain the nickel complex of the dye compound of Example 10. When the metallized pigment thus obtained was intimately dispersed in finely divided condition in a cellulose acetate-acetone dope solution in a concentration of 2% (based on the weight of the cellulose acetate) and the cellulose acetate dope solution was extruded in known manner a bright yellow yarn having excellent fastness to light and washing was obtained.

Example 16

Example 13 was run precisely as before except that the nickel thiocyanate was replaced by 150 cc. of 17% cobalt thiocyanate. The dye product obtained (the cobalt complex of the dye of Example 11) showed the same excellent properties as the metallized dye product of Example 13.

The following tabulation further illustrates the monoazo compounds of our invention and sets forth the colors the non-metallized compounds yield on cellulose acetate, and an acrylonitrile graft polymer, as well as the colors obtained on cellulose acetate when the non-metallized compounds are metallized on the fiber. The preparation of the acrylonitrile graft polymer referred to in the tabulation is described immediately following the tabulation.

"C.A." refers to cellulose acetate, "Original" refers to the non-metallized dye compounds and "Final" refers to the metallized dye compounds.

| Diazo Component | Coupling Component | Metallizing Agent | Color on C.A. Original | Color on C.A. Final | Color on Acrylonitrile Graft Polymer Original |
|---|---|---|---|---|---|
| 2,5-Diethoxyaniline | 3-Phenyl-5-pyrazolone | Ni(SCN)₂ | gold | yellow | yellow. |
| Do | do | Co(SCN)₂ | do | gold | |
| Do | 1-Phenyl-3-methyl-5-pyrazolone | Ni(SCN)₂ | do | yellow | Do. |
| Do | do | Co(SCN)₂ | do | gold | |
| Do | 5-Pyrazolone-3-carboxylic acid | Ni(SCN)₂ | orange | do | |
| Do | do | Co(SCN)₂ | do | do | |
| Do | 3-Methyl-5-pyrazolone | Ni(SCN)₂ | yellow | yellow | Do. |
| Do | do | Co(SCN)₂ | do | do | |
| Do | 1,3-Diphenyl-5-pyrazolone | Ni(SCN)₂ | orange | gold | |
| Do | do | Co(SCN)₂ | do | do | |
| 2,5-Dimethoxy-4-nitroaniline | 3-Phenyl-5-pyrazolone | Ni(SCN)₂ | yellow | orange | |
| Do | do | Co(SCN)₂ | do | do | |
| Do | 3-Methyl-5-pyrazolone | Ni(SCN)₂ | do | do | |
| Do | do | Co(SCN)₂ | do | do | |
| Do | 1-Phenyl-3-methyl-5-pyrazolone | Ni(SCN)₂ | do | do | |
| Do | do | Co(SCN)₂ | do | do | |
| Do | 3-Trifluoromethyl-5-pyrazolone | Ni(SCN)₂ | do | do | |
| Do | do | Co(SCN)₂ | do | do | |
| 2,5-Dimethoxy-4-chloroaniline | 1-Phenyl-3-methyl-5-pyrazolone | Ni(SCN)₂ | do | yellow | Do. |
| Do | do | Co(SCN)₂ | do | do | |
| Do | 3-Methyl-5-pyrazolone | Ni(SCN)₂ | do | do | Do. |
| Do | do | Co(SCN)₂ | do | do | |
| Do | 3-(o-Methylphenyl)-5-pyrazolone | Ni(SCN)₂ | do | do | Do. |
| Do | do | Co(SCN)₂ | do | do | |
| 4-N-methylsulfonamido-2,5-dimethoxyaniline | 3-Phenyl-5-pyrazolone | Ni(SCN)₂ | do | do | Do. |
| Do | do | Co(SCN)₂ | do | do | |
| Do | 3-Methyl-1-(2,4,6-trichlorophenyl)-5-pyrazolone | Ni(SCN)₂ | do | do | |
| Do | do | Co(SCN)₂ | do | do | |
| Do | 3-Trifluoromethyl-5-pyrazolone | Ni(SCN)₂ | do | do | Do. |
| Do | do | Co(SCN)₂ | do | do | |
| 2,5-Dimethoxy-4-t-butylaniline | 3-Methyl-5-pyrazolone | Ni(SCN)₂ | tan | do | |
| Do | do | Co(SCN)₂ | do | do | |
| Do | 1-(p-methoxyphenyl)-3-methyl-5-pyrazolone | Ni(SCN)₂ | do | do | |
| Do | do | Co(SCN)₂ | do | do | |
| Do | Ethyl 1-phenyl-5-pyrazolone-3-carboxylate | Ni(SCN)₂ | yellow | orange | |
| Do | do | Co(SCN)₂ | do | do | |
| 2,5-Di-β-hydroxyethoxyaniline | 3-Trifluoromethyl-5-pyrazolone | Ni(SCN)₂ | orange | yellow | |
| Do | do | Co(SCN)₂ | do | do | |
| Do | 3-Methyl-5-pyrazolone | Ni(SCN)₂ | do | do | |
| Do | do | Co(SCN)₂ | do | do | |
| Do | 3-Phenyl-5-pyrazolone | Ni(SCN)₂ | do | do | |
| Do | do | Co(SCN)₂ | do | do | |
| Do | 3-N-Phenylamino-5-pyrazolone | Ni(SCN)₂ | yellow | do | Do. |
| Do | do | Co(SCN)₂ | do | do | |
| Do | 3-Methyl-1-m-nitrophenyl-5-pyrazolone | Ni(SCN)₂ | orange | do | |
| Do | do | Co(SCN)₂ | do | do | |
| Do | 3-Amino-1-p-cyanophenyl-5-pyrazolone | Ni(SCN)₂ | yellow | do | Do. |
| Do | do | Co(SCN)₂ | do | do | |
| Do | 3-Methyl-1-phenyl-5-pyrazolone | Ni(SCN)₂ | orange | do | |
| Do | do | Co(SCN)₂ | do | do | |
| Do | 3-Hydroxy-1-phenyl-5-pyrazolone | Ni(SCN)₂ | yellow | do | Do. |
| Do | do | Co(SCN)₂ | do | do | |
| Do | 3-Methyl-1-(2,4,6-trichlorophenyl)-5-pyrazolone | Ni(SCN)₂ | do | do | Do. |
| Do | do | Co(SCN)₂ | do | do | |
| p-Anisidine | 3-Methyl-1-p-amidosulfophenyl-5-pyrazolone | Ni(SCN)₂ | do | do | Do. |
| Do | do | Co(SCN)₂ | do | do | |
| Do | 3-Trifluoromethyl-5-pyrazolone | Ni(SCN)₂ | do | do | Do. |
| Do | do | Co(SCN)₂ | do | do | |
| Do | 3-N-Phenylamino-5-pyrazolone | Ni(SCN)₂ | brown | do | |
| Do | do | Co(SCN)₂ | do | do | |
| Do | 1,3-Diphenyl-5-pyrazolone | Ni(SCN)₂ | yellow | do | Do. |
| Do | do | Co(SCN)₂ | do | do | |
| Do | 3-Methyl-1-phenyl-5-pyrazolone | Ni(SCN)₂ | do | do | Do. |
| Do | do | Co(SCN)₂ | do | do | |
| Do | 3-Methyl-5-pyrazolone | Ni(SCN)₂ | do | do | Do. |
| Do | do | Co(SCN)₂ | do | do | |
| 2,4-Dimethoxyaniline | 1,3-Diphenyl-5-pyrazolone | Ni(SCN)₂ | do | do | Do. |
| Do | do | Co(SCN)₂ | do | do | |
| 3,4-Dimethoxyaniline | 3-Methyl-1-phenyl-5-pyrazolone | Ni(SCN)₂ | do | do | Do. |
| Do | do | Co(SCN)₂ | do | do | |
| o-Anisidine | do | Ni(SCN)₂ | do | do | Do. |
| Do | do | Co(SCN)₂ | do | do | |
| Do | 1,3-Diphenyl-5-pyrazolone | Ni(SCN)₂ | do | do | Do. |
| Do | do | Co(SCN)₂ | do | do | |
| 2,5-Dimethoxyaniline | 3-Phenyl-5-pyrazolone | Ni(SCN)₂ | do | do | Do. |
| Do | do | Co(SCN)₂ | do | do | |
| Do | 3-Methyl-1-(2,4,6-trichlorophenyl)-5-pyrazolone | Ni(SCN)₂ | do | do | Do. |
| Do | do | Co(SCN)₂ | do | do | |
| Do | 3-Carboethoxy-5-pyrazolone | Ni(SCN)₂ | do | do | Do. |
| Do | do | Co(SCN)₂ | do | do | |
| Do | 3-Trifluoromethyl-5-pyrazolone | Ni(SCN)₂ | do | do | Do. |
| Do | do | Co(SCN)₂ | do | do | |
| Do | 3-Hydroxy-1-phenyl-5-pyrazolone | Ni(SCN)₂ | do | do | Do. |
| Do | do | Co(SCN)₂ | do | do | |
| Do | 3-Amino-1-phenyl-5-pyrazolone | Ni(SCN)₂ | do | do | Do. |
| Do | do | Co(SCN)₂ | do | do | |
| Do | 3-Methyl-1-p-nitrophenylsulfo-5-pyrazolone | Ni(SCN)₂ | do | do | Do. |
| Do | do | Co(SCN)₂ | do | do | |
| Do | 3-Phenyl-1-p-nitrophenylsulfo-5-pyrazolone | Ni(SCN)₂ | do | do | Do. |
| Do | do | Co(SCN)₂ | do | do | |
| Do | 3-Amino-1-p-nitrophenyl-5-pyrazolone | Ni(SCN)₂ | do | do | Do. |
| Do | do | Co(SCN)₂ | do | do | |
| Do | 3-Amino-1-(2-benzothiazolyl)-5-pyrazolone | Ni(SCN)₂ | do | do | Do. |
| Do | do | Co(SCN)₂ | do | do | |

| Diazo Component | Coupling Component | Metallizing Agent | Color on C.A. Original | Color on C.A. Final | Color on Acrylonitrile Graft Polymer Original |
|---|---|---|---|---|---|
| 2,5-Dimethoxyaniline | 3-Methyl-1-(2-naphthyl)-5-pyrazolone | Ni(SCN)₂ | yellow | yellow | yellow. |
| Do | do | Co(SCN)₂ | do | do | |
| Do | 3-Phenyl-1-(3,4-dichlorophenyl)-5-pyrazolone | Ni(SCN)₂ | orange | orange | orange. |
| Do | do | Co(SCN)₂ | do | do | |
| Do | 3-Methyl-1-(3,4-dichlorophenyl)-5-pyrazolone | Ni(SCN)₂ | do | brown | |
| Do | do | Co(SCN)₂ | do | do | |
| Do | 3-Amino-1-(7-quinolinyl)-5-pyrazolone | Ni(SCN)₂ | yellow | yellow | yellow. |
| Do | do | Co(SCN)₂ | do | do | |
| o-Anisidine | 3-Methyl-1-(p-methylphenyl)-5-pyrazolone | Ni(SCN)₂ | do | do | Do. |
| Do | do | Co(SCN)₂ | do | do | |
| Do | 3-Methyl-1-(o-methoxyphenyl)-5-pyrazolone | Ni(SCN)₂ | do | do | Do. |
| Do | do | Co(SCN)₂ | do | do | |

PREPARATION OF ACRYLONITRILE GRAFT POLYMER 3.0 g. of acrylonitrile and 7.0 g. of N-methyl methacrylamide were emulsified in 40 cc. of water containing 0.15 g. of potassium persulfate and 0.01 g. of tertiary dodecyl mercaptan. The emulsion was heated at 60° C. until 94% or more of the monomers had copolymerized. This result is usually accomplished by heating for about 12 hours. The copolymer contained approximately 30% by weight of acrylonitrile and 70% by weight of N-methyl methacrylamide. The mixture was then cooled to room temperature, 50 cc. of water added and the mixture agitated until a homogeneous solution of dope containing 10% by weight of the copolymer resulted.

30.7 g. (3.07 g. of copolymer) of the above prepared solution or dope of the copolymer were placed in a jacketed reactor provided with an agitator and heat exchanger. There were then added 10 g. of acrylonitrile, 114 cc. of water, 0.58 g. of 85% phosphoric acid, 0.1 g. of potassium persulfate, 0.17 g. of potassium metabisulfite, 0.1 g. of tertiary dodecyl mercaptan and 0.56 g. of a 30% solution in water of N-methyl methacrylamide and the mixture heated, with stirring, to 35° C. and then allowed to level off at 37°–39° C. After the heat of polymerization had been removed and when the conversion of the acrylonitrile to polymer had reached 96% or more, which is usually accomplished in a period of about 12 hours, the temperature was raised to 90° C. The mother liquor was removed by centrifuging the polymerization mixture, the polymer precipitate being reslurried twice with water and centrifuged to a 70% moisture cake. The cake was dried under vacuum at 80° C. in an agitated dryer. The overall yield of modified polyacrylonitrile product was over 90%. After hammer-milling, the dry powder, now ready for spinning, was stored in a moisture proof container.

The acrylonitrile graft polymer prepared as above and containing about 18% by weight of N-methyl methacrylamide was soluble in N,N-dimethylformamide. Fibers spun by extruding a solution of the polymer product in N,N-dimethylformamide into a precipitating bath had a softening temperature of about 240° C., an extensibility of about 20–30 percent depending on the drafting and relaxing conditions, and showed excellent affinity for dyes.

The non-metallized monoazo dye compounds of our invention can be applied to cellulose alkyl carboxylic acid esters having 2 to 4 carbon atoms in the acid groups thereof, nylon, an acrylonitrile polymer, such as polyacrylonitrile and acrylonitrile graft polymers, and polyester, such as polyethylene terephthalate, textile materials and the metallized azo dye compounds of our invention can be applied to nitrogenous textile materials such as, for example, wool, silk, nylon and acrylonitrile polymers, such as polyacrylonitrile and acrylonitrile graft polymers, in the form of an aqueous dispersion and are ordinarily so applied.

To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried. In the case of certain of the acrylonitrile graft polymers described hereinbefore it is necessary to dye at the boil for an extended period of time. Instances may be encountered where the fiber is not satisfactorily colored by the dyeing procedure just described. In these instances special dyeing techniques, such as the use of pressure, for example, developed by the art for the coloration of materials difficult to color may be employed.

Widely varying amounts of dye can be used in the dyeing operation. The amount of dye used can be, for example, ⅓ to 3% (by weight) of that of the textile material although lesser or greater amounts of the dye can be employed.

The following example illustrates one satisfactory way in which the fibers of the acrylonitrile graft polymers can be dyed using either the non-metallized or metallized azo compounds of our invention. 16 milligrams of dye are ground with an aqueous solution of sodium lignin sulfonate until well dispersed or alternately the dye can be dissolved in 5 cc. of hot ethylene glycol monoethyl ether. The dispersion or solution, as the case may be, is then poured into 150 cc. of water to which a small amount of a surface-active agent such as Igepon T ($C_{17}H_{33}.CO.N(CH_3).C_2H_4SO_3Na$)

Nekal BX (sodium alkylnaphthalenesulfonate) or Orvus (sodium lauryl sulfate-type) has been added. The dyebath is then brought to the desired temperature and 5 grams of well wet-out fibers of the graft polymer are added thereto. Dyeing is continued until the proper shade is reached. From time to time throughout the dyeing operation, the material is worked to promote even dyeing.

The expression "propionic-acetic (1:5) acids" refers to a mixture of propionic and acetic acids in which there are five parts by volume of acetic acid to 1 part of volume of propionic acid.

The non-metallized azo compounds dye nylon substantially the same shade as they dye acrylonitrile polymers.

Acrylonitrile graft polymers including those of the type specifically described hereinbefore are described and claimed in Coover U.S. application Serial No. 408,012, filed February 3, 1954, now Patent Number 2,838,470.

We claim:
1. The metallized azo compounds obtained by heating a monoazo compound having the formula:

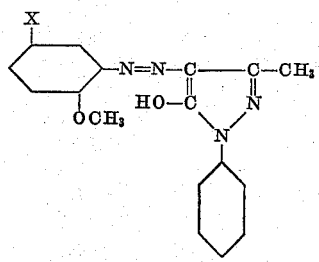

wherein X represents a member selected from the group consisting of a hydrogen atom and the methoxy group with a metallizing agent selected from the group consisting of nickel thiocyanate and cobalt thiocyanate at a temperature of about 100° C. and wherein the mole ratio of the metallizing agent to the monoazo compound is at least 0.5.

2. The metallized azo compound obtained in accordance with claim 1 wherein X is the methoxy group and the metallizing agent is nickel thiocyanate.

3. The metallized azo compound obtained in accordance with claim 1 wherein X is a hydrogen atom and the metallizing agent is nickel thiocyanate.

4. The metallized azo compound obtained in accordance with claim 1 wherein X is the methoxy group and the metallizing agent is cobalt thiocyanate.

5. The metallized azo compound obtained in accordance with claim 1 wherein X is a hydrogen atom and the metallizing agent is cobalt thiocyanate.

References Cited in the file of this patent

UNITED STATES PATENTS

| | | |
|---|---|---|
| 1,959,507 | Straub et al. | May 22, 1934 |
| 2,150,180 | McNally et al. | Mar. 14, 1939 |
| 2,565,898 | Widmer et al. | Aug. 28, 1951 |
| 2,599,147 | Widmer et al. | June 3, 1952 |
| 2,727,031 | Zickendraht et al. | Dec. 13, 1955 |
| 2,730,521 | Schetty et al. | Jan. 10, 1956 |
| 2,756,223 | Schetty | July 24, 1956 |
| 2,767,166 | Strobel et al. | Oct. 16, 1956 |

FOREIGN PATENTS

| | | |
|---|---|---|
| 513,360 | Belgium | Feb. 6, 1953 |